United States Patent
Holland

[11] Patent Number: 5,987,026
[45] Date of Patent: Nov. 16, 1999

[54] COMMUNICATIONS NETWORK CARRYING SYNCHRONOUS AND ASYNCHRONOUS TRAFFIC

[75] Inventor: Peter Holland, Herts, United Kingdom

[73] Assignee: Northern Telecom Limited, Montreal, Canada

[21] Appl. No.: 08/822,107

[22] Filed: Mar. 21, 1997

[30] Foreign Application Priority Data

Mar. 22, 1996 [GB] United Kingdom ............... 9606055

[51] Int. Cl.⁶ .................................................. H04J 3/12
[52] U.S. Cl. .......................... 370/353; 370/355; 370/476
[58] Field of Search .................................. 370/352, 353, 370/354, 355, 474, 476

[56] References Cited

U.S. PATENT DOCUMENTS

| | | | |
|---|---|---|---|
| 4,926,416 | 5/1990 | Weik | 370/354 |
| 5,119,370 | 6/1992 | Terry | 370/354 |
| 5,315,594 | 5/1994 | Noser | 370/353 |
| 5,341,376 | 8/1994 | Yamashita | 370/466 |
| 5,526,349 | 6/1996 | Diaz et al. | 370/476 |

FOREIGN PATENT DOCUMENTS

| | | |
|---|---|---|
| 0554970 | 8/1993 | European Pat. Off. . |
| 2263210 | 7/1993 | United Kingdom . |
| 91/05426 | 4/1991 | WIPO . |

OTHER PUBLICATIONS

Fisher et al. IEE Conference publication No. 39, Oct. 1990, pp. 73–78, Figs. 3 & 4.
Takase et al. Proc. Globecom 93, Dec. 1993, pp. 1481–1487, section 6.

*Primary Examiner*—Min Jung
*Attorney, Agent, or Firm*—Lee, Mann, Smith, McWilliams, Sweeney & Ohlson

[57] ABSTRACT

A synchronous transmission system is adapted to carry both synchronous and asynchronous traffic and has a number of nodes providing ingress and egress of the traffic. Each node includes first and second ATM/SDH identifiers whereby the switch can separate the synchronous and asynchronous traffic Separate processing of synchronous and asynchronous traffic is performed at each node.

4 Claims, 3 Drawing Sheets

COMMUNICATIONS NETWORK CARRYING SYNCHRONOUS AND ASYNCHRONOUS TRAFFIC

This invention relates to communications networks and in particular to synchronous networks carrying both synchronous and asynchronous (ATM) traffic.

BACKGROUND OF THE INVENTION

A recent development in communications technology has been the introduction of synchronous networks commonly referred to as synchronous digital hierarchy (SDH) or, in North America, as SONET. Synchronous networks have the significant advantage of simplifying the process of demultiplexing channels and thus avoid the need for the so-called multiplexer/demultiplexer mountains that were associated with previous plesiochronous techniques.

Synchronous networks are now being used to carry both synchronous and asynchronous/ATM traffic. The asynchronous or ATM traffic is carried in cells which are carried over the synchronous network in standard SDH virtual containers (VCs). The cells are recovered from the virtual containers into the standard ATM transmission format at the egress from the synchronous network. Arrangements for carrying both synchronous and ATM traffic are described for example in U.S. Pat. No. 4,926,416 and IEE Conference Publication No 39, October 1990, pages 73–78.

These conventional systems suffer from the disadvantage that they are of complex construction and require a relative large number of ATM ports to handle the ATM traffic. Further, many of these systems are inefficient in their use of bandwidth.

SUMMARY OF THE INVENTION

An object of the invention is to minimise or to overcome this disadvantage.

A further object of the invention is to provide an improved arrangement and method for carrying ATM traffic over a synchronous network.

According to the invention there is provided a synchronous transmission system adapted to carry both synchronous and asynchronous traffic in virtual containers each provided with a respective path overhead, the system having a number of nodes providing ingress and egress of said traffic, wherein means are provided at said nodes for identifying the synchronous and asynchronous traffic from said path overheads and means for performing separate switching of the identified synchronous and asynchronous traffic at that node.

According to another aspect of the invention there is provided a multiplexer/demultiplexer node for a synchronous network carrying synchronous and asynchronous traffic in virtual containers each provided with a path header, the node including means for identifying the synchronous and asynchronous traffic from said path overheads and means for performing separate switching of the identified synchronous and asynchronous traffic at that node.

According to another aspect of the invention there is provided a method of processing communications traffic comprising synchronous traffic and asynchronous traffic carried in virtual containers and received at a synchronous network node, the method including providing each said virtual container with a path overhead, providing in said path overhead information identifying the traffic as synchronous or asynchronous, retrieving said identifying information at said node, and, responsive to said retrieval, providing separate switching of the synchronous and asynchronous traffic at the node.

In one embodiment, the indication of the traffic type within a virtual container may be provided in the signal label (C2) byte of the path header. In a further embodiment, the path trace (J1) can be employed in conjunction with a look-up table provided at the node to determine the traffic type.

The arrangement and method facilitate the handling of synchronous and asynchronous traffic and provide a more effective use of the transmission bandwidth. Further, cell consolidation from sources with a high peak and a low average rate can be achieved in a single VC stream. The technique is compatible with existing transmission standards.

BRIEF DESCRIPTION OF THE DRAWINGS

An embodiment of the invention will now be described with reference to the accompanying drawing in which.

DESCRIPTION OF PREFERRED EMBODIMENT

Figure 1:
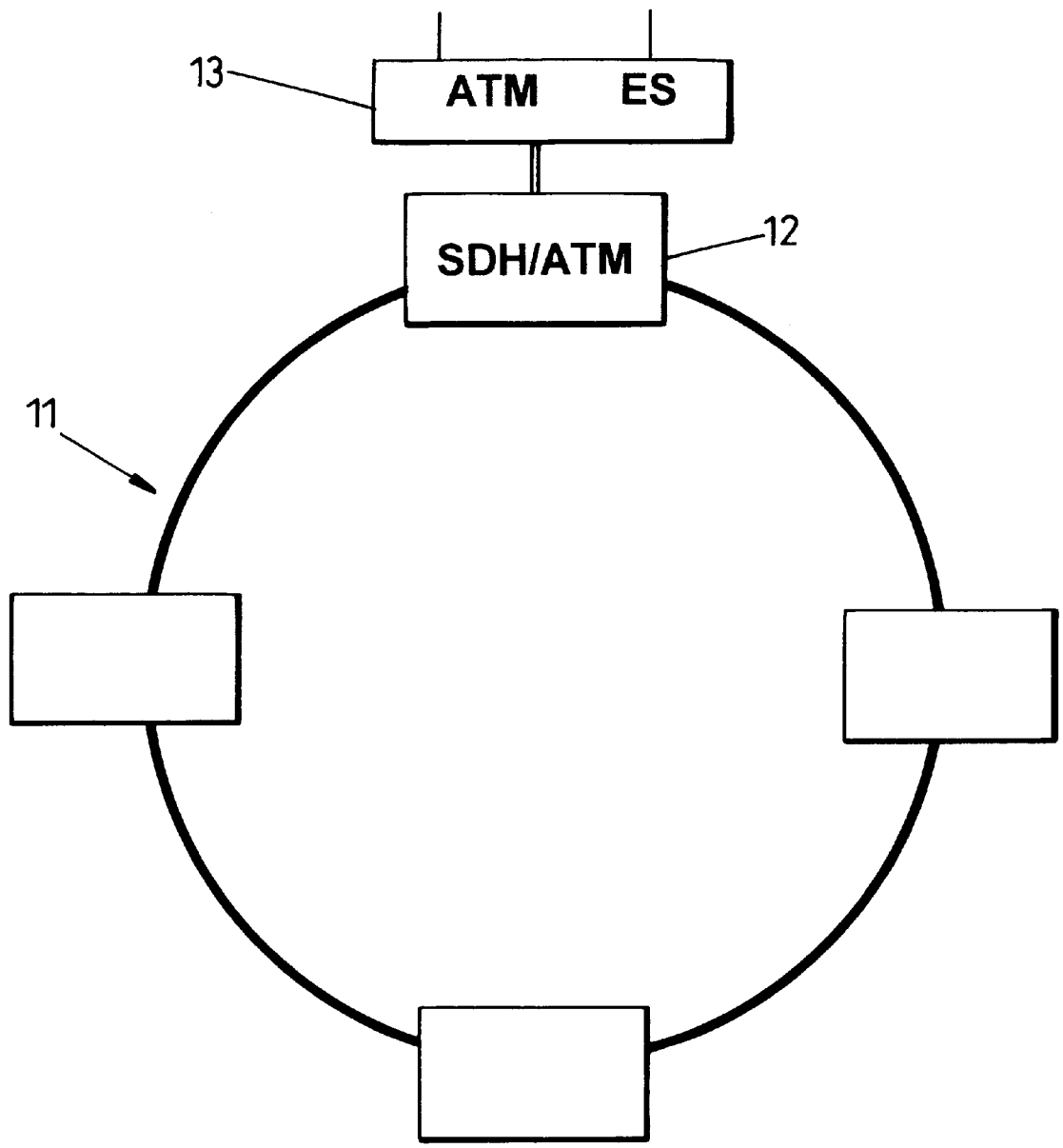
FIG. 1 is a schematic diagram showing an SDH ring network carrying synchronous and asynchronous/ATM traffic between network nodes.

Referring to FIG. 1, communications traffic enters and leaves the SDH ring network 11 via nodes 12 each of which provides a multiplexing/demultiplexing function. Asynchronous/ATM traffic arriving at a node is already in or is packaged into SDH virtual containers for transmission over the SDH network 11 to an appropriate egress node. Typically the ring 11 carries four VC4 streams, although other synchronous formats can of course be employed. Further, although a ring network is shown in FIG. 1, it will be appreciated that other network constructions are envisaged.

Figure 2:
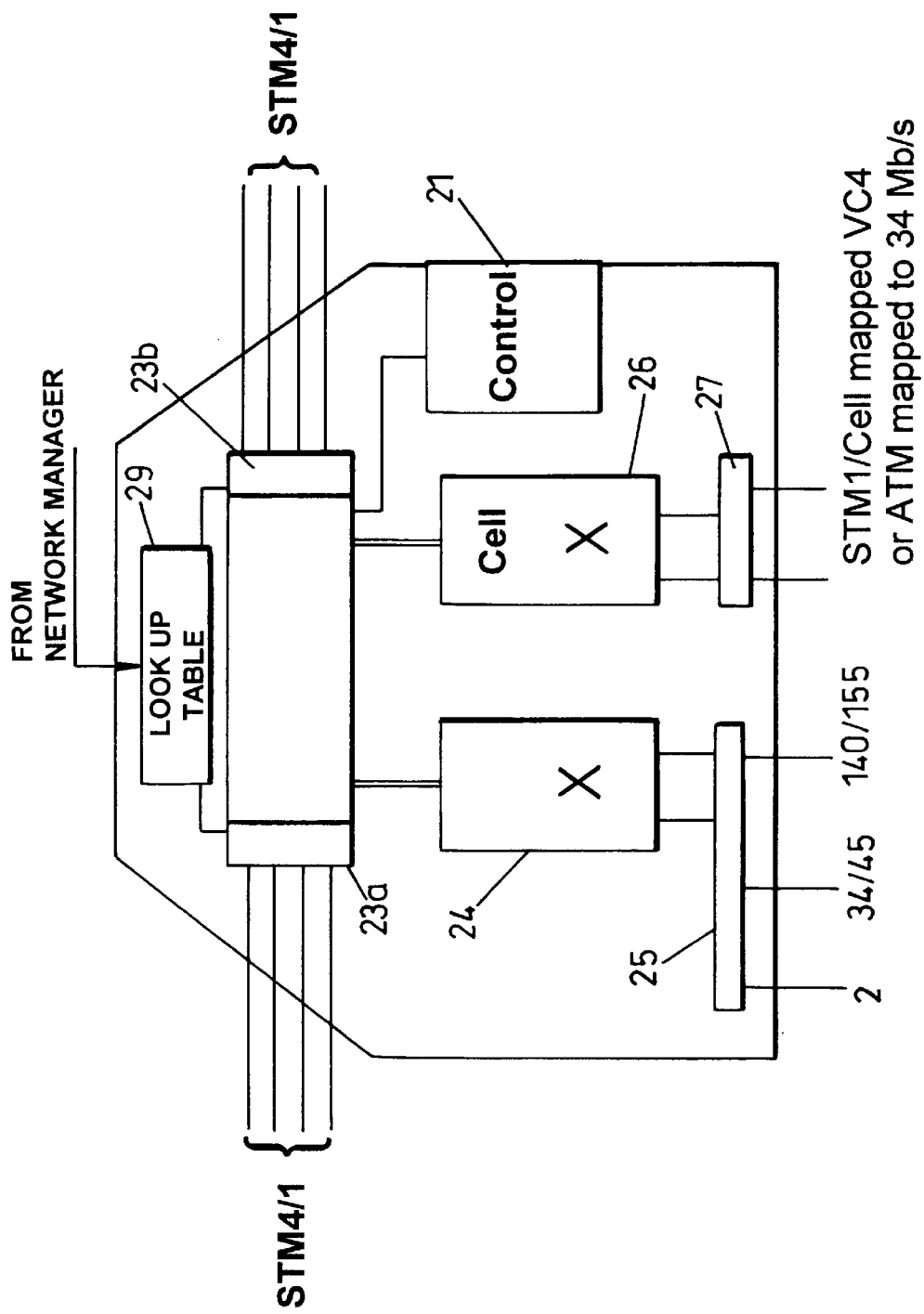
FIG. 2 shows the construction of a node of the network of FIG. 1.

The construction of a network node or multiplexer/demultiplexer is shown in FIG. 2. Traffic is carried on the ring in a STM4/1 format, but it will be appreciated that other standard SDH formats are equally applicable. The node is controlled by a network manager interfaced by the control function 21 and includes a switch 22, e.g. a 4/4 or 4/3 switch which interfaces with the ring via ATM/SDH identifiers 23a, 23b. These identifiers alert the switch as to the type of traffic that is being handled. Received synchronous traffic is directed or demultiplexed via a 4/1 cross connect 24 to a synchronous interface 25 which is in turn coupled to 2 Mbit, 34/35 Mbit and 140/155 Mbit tributaries. Synchronous traffic received from the tributaries is multiplexed up for transmission to the ring.

Figure 3:
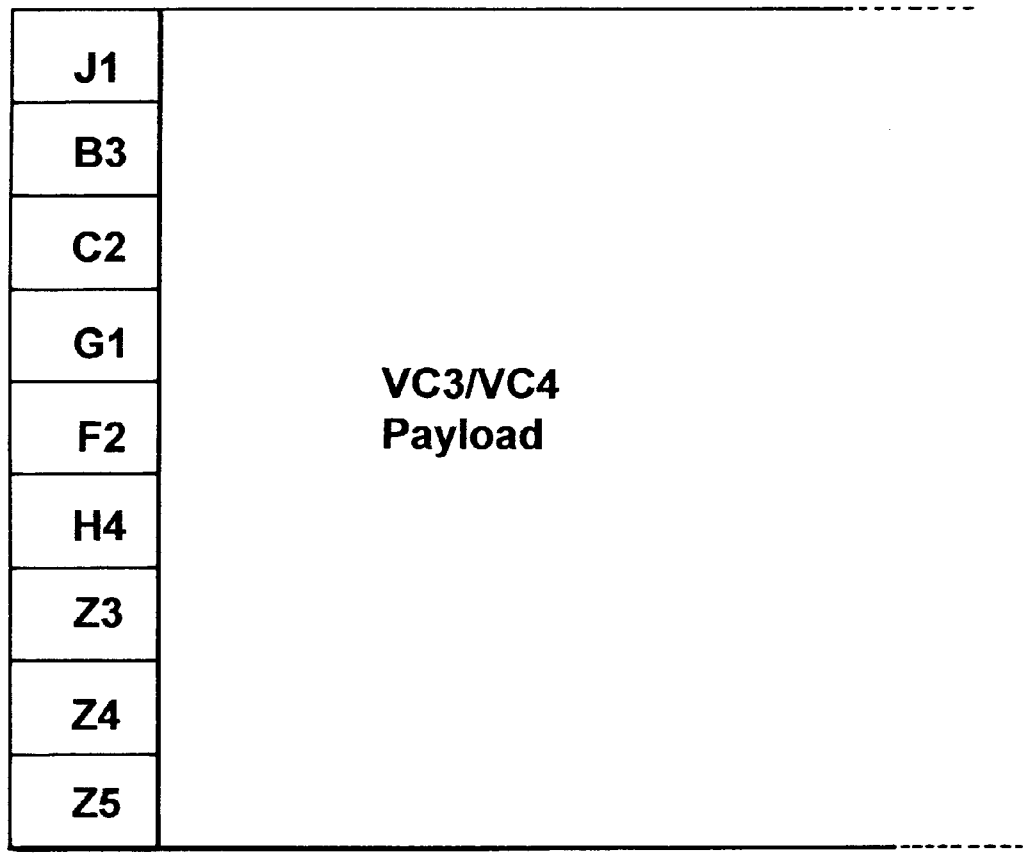
FIG. 3 illustrates the path overhead of a synchronous virtual container.

Each virtual container arriving at the node is examined to determine whether it contains ATM or SDH traffic. This is effected by use of the path overhead associated with that virtual container. The most general mechanism for distinguishing between VC3/4s containing different types of traffic involves the use of the signal label (C2) byte within the VC3 or VC4 path overhead. The VC3/4 path overhead, which is shown schematically in FIG. 3, comprises a number of preallocated fields each having a set number of bytes and each reserved for carrying a particular type of information. For example, the J1 byte contains the path trace, the B3 byte provides bit error monitoring and the C2 byte indicates the composition of the payload. The ITU-R G.707 recommendation for the C2 byte specifies hex codes relating to different types of traffic as illustrated in the table below.

TABLE 1

| C2 byte hex code | Traffic type |
|---|---|
| 00 | unequipped |
| 01 | equipped non-specific |
| 02 | TUG structure |
| 03 | locked TU |
| 04 | asynchronous mapping of 34 and 44 Mbit/s into container-3 |
| 12 | asynchronous mapping of 140 Mbit/s into container-4 |
| 13 | ATM |
| 14 | MAN (DQDB) |
| 15 | FODI |

Those virtual containers containing asynchronous/ATM traffic are identified by the identifiers 23 by reading the cell C2 headers described in the above table and the ATM cells contained therein are directed to a cell switch 26 for output via an asynchronous interface 27. The interface maps received ATM cells into a VC4 /34 or 2 Mbit/s PDH format or maps outgoing ATM cells to these formats or other standard formats.

Similarly, those virtual containers containing synchronous traffic are also identified from the C2 header information and the synchronous traffic contained therein is routed to the cross-connect 24.

In an alternative embodiment, the path trace J1 byte is employed to identify the type of traffic within each virtual container. The path trace, which uniquely identifies a particular path, is assigned by the network manager to each virtual container that is created by any of the network elements under its control. The network manager also informs each network element as to which path traces are to be expected with incoming virtual containers. In the present arrangement, this information is stored, together with an indication of the traffic type corresponding to each path trace, in a look-up table 29 that is accessible by the identifiers 23. On arrival of a virtual container, the identifier matches the path trace against the corresponding look-up table entry to determine whether the traffic is synchronous or asynchronous. Preferably, as a default option, traffic for which no matching path trace can be found in the look-up table is routed to the cross-connect 24.

In an further embodiment, the switch 22 may be controlled by the network manager which maintains a record of the traffic being transmitted and is thus aware of its precise arrival time the switch. In this way the switch can be instructed by the network manager to route the SDH and ATM traffic to the respective switches and the identifiers may then be dispensed with.

It will be appreciated that, although the system and method have been described above with particular reference to the European SDH protocol, they are in no way limited to that protocol. Thus, with appropriate minor adaptation, the technique may be adapted e.g. to the North American SONET protocol. It will also be apreciated that the technique is applicable to both unidirectional and bidirectional rings.

I claim:

1. A synchronous transmission system adapted to carry both synchronous and asynchronous traffic in respective virtual containers, the system having a network manager and incorporating a number of nodes providing ingress and egress of said traffic to and from the network, wherein each said node incorporates an asynchronous cell switch providing the ingress and egress of the asynchronous traffic and a cross-point providing the ingress and egress of the synchronous traffic, wherein each said virtual container is provided by the network manager with a respective path overhead including a path trace uniquely identifying a path through the network for that virtual container, wherein the network manager informs each said node of each path trace and of the respective synchronous or asynchronous traffic type associated with that trace whereby each said node is enabled to determine from the path trace the traffic type of a virtual container arriving at that node so as to route the asynchronous traffic to said cell switch and to route the synchronous traffic to said cross-point.

2. A system as claimed in claim 1, and including means for demultiplexing synchronous traffic via a cross-connect to a synchronous interface.

3. A method of processing communications traffic comprising synchronous traffic and asynchronous traffic carried in respective virtual containers and received at a synchronous network node providing ingress and egress of said traffic to and from the network and incorporating an asynchronous cell switch providing the ingress and egress of the asynchronous traffic and a cross-point providing the ingress and egress of the synchronous traffic, the method including providing each said virtual container with a path overhead including a path trace uniquely identifying a path through the network for that virtual container, and informing the node of each said path trace and of the respective synchronous or asynchronous traffic type associated with that trace whereby the node is enabled to determine from the path trace the traffic type of a virtual container arriving at that node so as to route the asynchronous traffic to said cell switch and to route the synchronous traffic to said cross-point.

4. A method as claimed in claim 3, wherein said information retrieval is performed from a look-up table providing a matching between path traces and respective tragic types.

* * * * *